(12) United States Patent
Choi

(10) Patent No.: US 7,865,725 B2
(45) Date of Patent: Jan. 4, 2011

(54) PRINTING DEVICE CAPABLE OF AUTHORIZING PRINTING LIMITEDLY ACCORDING TO USER LEVEL, PRINTING SYSTEM USING THE SAME AND PRINTING METHOD THEREOF

(75) Inventor: In-sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1813 days.

(21) Appl. No.: 10/989,654

(22) Filed: Nov. 17, 2004

(65) Prior Publication Data

US 2005/0120244 A1 Jun. 2, 2005

(30) Foreign Application Priority Data

Dec. 1, 2003 (KR) .................... 10-2003-0086562

(51) Int. Cl.
H04L 29/06 (2006.01)
(52) U.S. Cl. .......................................... 713/166; 726/4
(58) Field of Classification Search ................ 726/2–5, 726/22, 17; 380/277–279, 283, 44; 713/166
See application file for complete search history.

(56) References Cited

U.S. PATENT DOCUMENTS

| | | | |
|---|---|---|---|
| 5,448,668 A * | 9/1995 | Perelson et al. ............... | 714/21 |
| 5,898,779 A * | 4/1999 | Squilla et al. ................ | 713/176 |
| 5,971,632 A * | 10/1999 | LaDue et al. ................. | 400/68 |
| 6,088,684 A * | 7/2000 | Custy et al. .................. | 705/35 |
| 6,198,996 B1 * | 3/2001 | Berstis ........................ | 701/36 |
| 6,289,462 B1 * | 9/2001 | McNabb et al. ............... | 726/21 |
| 6,389,542 B1 * | 5/2002 | Flyntz ......................... | 726/17 |
| 6,640,304 B2 * | 10/2003 | Ginter et al. ................. | 713/193 |
| 6,643,783 B2 * | 11/2003 | Flyntz .......................... | 726/9 |
| 6,678,764 B2 * | 1/2004 | Parvulescu et al. ............ | 710/65 |
| 6,711,677 B1 * | 3/2004 | Wiegley ...................... | 713/151 |
| 6,732,278 B2 * | 5/2004 | Baird et al. .................... | 726/7 |
| 6,816,968 B1 * | 11/2004 | Walmsley .................... | 713/168 |

(Continued)

FOREIGN PATENT DOCUMENTS

JP 08-3146559 11/1996

(Continued)

OTHER PUBLICATIONS

Korean Official Action issued on Sep. 30, 2005, for Korean Patent Application No. 2003-86562.

*Primary Examiner*—David García Cervetti
(74) *Attorney, Agent, or Firm*—Stanzione & Kim, LLP

(57) ABSTRACT

A printing device which authorizes a printing limitedly according to a user level, a printing system using the same and a printing method thereof. The printing device includes an interface part receiving a printing data requested by a user and a security level of the requested printing data; an authentication part determining whether to print the requested printing data based on the security level and a pre-stored user level of the user; a printing part printing the requested printing data; and a controller transmitting the requested printing data received through the interface part to the printing part if the authentication part permits the printing. Accordingly, even if a user obtains an access to the system, because the user has a limitation in using and printing the data depending on his/her position or job, the security of the data can be more effectively guaranteed.

18 Claims, 6 Drawing Sheets

U.S. PATENT DOCUMENTS

| | | | |
|---|---|---|---|
| 6,839,842 B1 * | 1/2005 | Iverson et al. | 713/176 |
| 7,287,270 B2 * | 10/2007 | Kai | 726/2 |
| 7,380,121 B2 * | 5/2008 | Nomura et al. | 713/166 |
| 7,454,796 B2 * | 11/2008 | Mazzagatte et al. | 726/28 |
| 7,574,745 B2 * | 8/2009 | Yoneyama | 726/27 |
| 2003/0014368 A1 * | 1/2003 | Leurig et al. | 705/64 |
| 2004/0125402 A1 * | 7/2004 | Kanai et al. | 358/1.15 |
| 2004/0187022 A1 * | 9/2004 | Asada et al. | 713/200 |

FOREIGN PATENT DOCUMENTS

| | | |
|---|---|---|
| JP | 09-293036 | 11/1997 |
| JP | 2001-075752 | 3/2001 |
| JP | 2001-325249 | 11/2001 |
| KR | 1997-57666 | 3/1997 |
| KR | 2002-24231 A | 3/2002 |
| KR | 2003-0077795 | 10/2003 |

* cited by examiner

FIG. 3

| ID | USER LEVEL | PASSWORD RECEIVING END |
|---|---|---|
| USER1 | B | user1@samsung.com |
| USER2 | C | 011-123-4567 |
| USER3 | A | user3@samsung.com |

PRINTING DEVICE CAPABLE OF AUTHORIZING PRINTING LIMITEDLY ACCORDING TO USER LEVEL, PRINTING SYSTEM USING THE SAME AND PRINTING METHOD THEREOF

CROSS-REFERENCE TO RELATED APPLICATIONS

This application claims the benefit of Korean Patent Application No. 2003-86562, filed on Dec. 1, 2003, in the Korean Intellectual Property Office, the disclosure of which is incorporated herein by reference.

BACKGROUND OF THE INVENTION

1. Field of the Invention

The present general inventive concept relates to a printing device, a printing system using the same and a printing method thereof. More particularly, the present general inventive concept relates to a printing device which limitedly authorizes printing when printing data requires security, a printing system using the same, and a printing method thereof.

2. Description of the Related Art

As an information-oriented era has arrived, the amount of processing data increases and also security concerns increase. Especially, in organizations or offices which deal in new technologies and know-how, data security becomes much more important.

A network system enabling several users to share a recording device or a printing device has recently become increasingly developed, so that limited resources can be efficiently utilized. However, the organizations or offices that adopt such a network system may face data security threats because unspecified persons obtain access to the data with ease. Therefore, numerous systems employing an authentication procedure to solve this problem have been developed.

FIG. 1 is a view showing a conventional printing system as one example of the network system as described above. Referring to FIG. 1, the printing system comprises a user personal computer (PC) 10, a database server 20, and a printer server 30.

A user performs a job with respect to data stored in the database server 20 through the user PC 10, and prints the data through the printer sever 30.

In order to have access to the database server 20 and the printer server 30 through the user PC 10, the user has to perform a predetermined authentication procedure. According to the related art authentication procedure, the user generally inputs his/her ID and password through the user PC 10 to obtain permission to access to the printing system.

After the authentication procedure of inputting the ID and the password, the user is allowed to use data stored in the database sever 20 and print the stored data through the printer server 30 unlimitedly.

Meanwhile, each data has a different security level. That is, the data are various, ranging from general data available to all users to top security data available to only the authorized user. Also, in general, the users each have a different user level according to user's job or position in office.

However, in the conventional printing system, access to the printing system is only restricted, and it is impossible to restrict use of data according to the user level of a user who is allowed to access to the system.

Also, when an unauthorized user steals an ID and password to gain access to the printing system, there is no way to prevent the stealing of data.

SUMMARY OF THE INVENTION

The present general inventive concept has been developed in order to solve the above problems in the related art. Accordingly, an aspect of the present general inventive concept is to provide a printing device which authorizes a printing limitedly by assigning a printing permission to users differently, and prints only the data as permitted, a printing system using the same and a printing method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive are achieved by providing a printing device comprising: an interface part receiving printing data requested by a user and a security level of the requested printing data; an authentication part determining whether to print the requested printing data based on the security level and a pre-stored user level of the user; a printing part printing the requested printing data; and a controller transmitting the requested printing data received through the interface part to the printing part if the authentication part permits the printing.

The authentication part may comprise: an authentication information storage part storing an authentication information including the user level; and an authentication determination part permitting the printing if the user level stored in the authentication information storage part is higher than the security level.

The authentication part may further comprise a password processing part randomly generating a password and transmitting the password to the user, the password processing part determining whether the generated password and a password inputted by the user are equal to each other, and if the authentication determination part permits the printing and the password processing part determines that the passwords are equal to each other, the controller transmits the requested printing data received through interface part to the printing part.

The password processing part may comprise: a password generator randomly generating a password; a password transmitter transmitting the generated password to the outside so that the user receives the password; and a password comparator determining whether the password generated by the password generator and the password inputted by the user are identical to each other.

The authentication part may further comprise an authentication management part determining whether to register the user based on the inputted authentication information of the user, and if the user is determined to be registered, storing the authentication information of the user in the authentication information storage part.

The foregoing and/or other aspects and advantages of the present general inventive concept may be also achieved by providing a printing method of a printer to print data which requires security, the method comprising: receiving printing data requested by a user and a security level of the requested printing data; determining whether to permit a printing with respect to the requested printing data based on the security level and a pre-stored user level of the user; and printing the requested printing data if the printing is permitted.

The operation of determining whether to permit a printing with respect to the requested printing data based on the security level and a pre-stored user level of the user may permit the printing if the user level is higher than the security level.

The operation of determining whether to permit a printing with respect to the requested printing data based on the security level and a pre-stored user level of the user may comprise the operations of randomly generating a password; transmitting the generated password to the outside so that the user receives the password; determining whether the generated password and a password inputted by the user are identical to each other; and, if the user level is higher than the security level and if the passwords are identical to each other, permitting the printing with respect to the requested printing data.

The printing method may further comprise the operations of determining whether to register the user based on authentication information of the user inputted by the user, and if the user is determined to be registered, storing the authentication information.

The foregoing and/or other aspects and advantages of the present general inventive concept may also be achieved by providing a printing system comprising: a file server storing therein data which requires security and a security level of the data; a client requesting the data stored in the file server to be printed; and a printing device receiving the requested printing data from the file server and the security level of the data, and based on the security level and a pre-stored user level of the user, determining whether to permit a printing of the requested printing data.

The printing device may comprise: an interface part receiving the requested printing data and the security level of the data from the file server; an authentication part determining whether to permit a printing with respect to the requested printing data based on the security level and the pre-stored user level; a printing part printing the requested printing data; and a printing device controller, if the printing is permitted, transmitting the requested printing data received through the interface part to the printing part.

The authentication part may comprise: an authentication information storage part storing therein authentication information including the user level corresponding the user who requests the printing; and an authentication determination part permitting the printing if the user level stored in the authentication storage part is higher than the security level.

The file server may comprise a storage part storing the data and the security level of the data; a header inserting part reading out the data and the security level of the data from the storage part and generating a data frame by inserting a header including the security level of the data to the data; an interface part receiving the data frame and transmitting the data frame to the printing device; and a file server controller controlling the header inserting part to generate the data frame with respect to the printing data which is requested by the user through the client, and applying the data frame generated by the header inserting part to the interface part.

The foregoing and/or other aspects and advantages of the present general inventive concept may be also achieved by providing a printing method of a printing system which comprises a file server storing data and security levels of the data, a client requesting data stored in the file server to be printed, and a printing device printing the requested printing data, comprises the operations of: the client transmitting a request to print to the file server; the file server transmitting the requested printing data and the security level of the data to the printing device; the printing device determining whether to permit a printing with respect to the requested printing data based on the security level and a pre-stored user level of the user; and (d) if the printing is permitted, the printing device printing the requested printing data.

In the operation of the file server transmitting the requested printing data and the security level of the data to the printing device, the file server generates a data frame by inserting a header including the security level of the requested printing data to the data, and transmits the data frame to the printing device.

The operation of the printing device determining whether to permit a printing with respect to the requested printing data based on the security level and a pre-stored user level of the user, may permit the printing if the user level is higher than the security level.

The operation of the printing device determining whether to permit a printing with respect to the requested printing data based on the security level and a pre-stored user level of the user, may comprise the operations of: randomly generating a password; transmitting the generated password to the outside so that the user receives the password; determining whether the generated password and a password inputted by the user through the client are identical to each other; and, if the user level is higher than the security level and if the passwords are identical to each other, permitting the printing with respect to the requested printing data.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a view explaining a database stored in the authentication information storage part of FIG. 2;

DETAILED DESCRIPTION OF THE PREFERRED EMBODIMENTS

Figure 1:
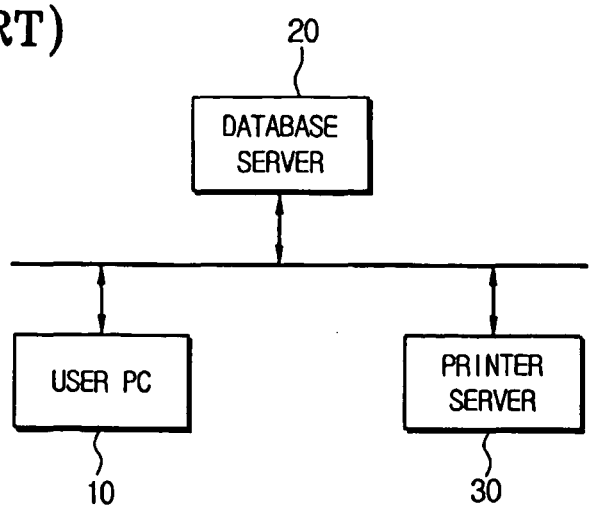
FIG. 1 is a view showing a conventional printing system.

Reference will now be made in detail to the embodiments of the present general inventive concept, examples of which are illustrated in the accompanying drawings; wherein like reference numerals refer to the like elements throughout. The embodiments are described below in order to explain the present general inventive concept by referring to the figures.

Figure 2:
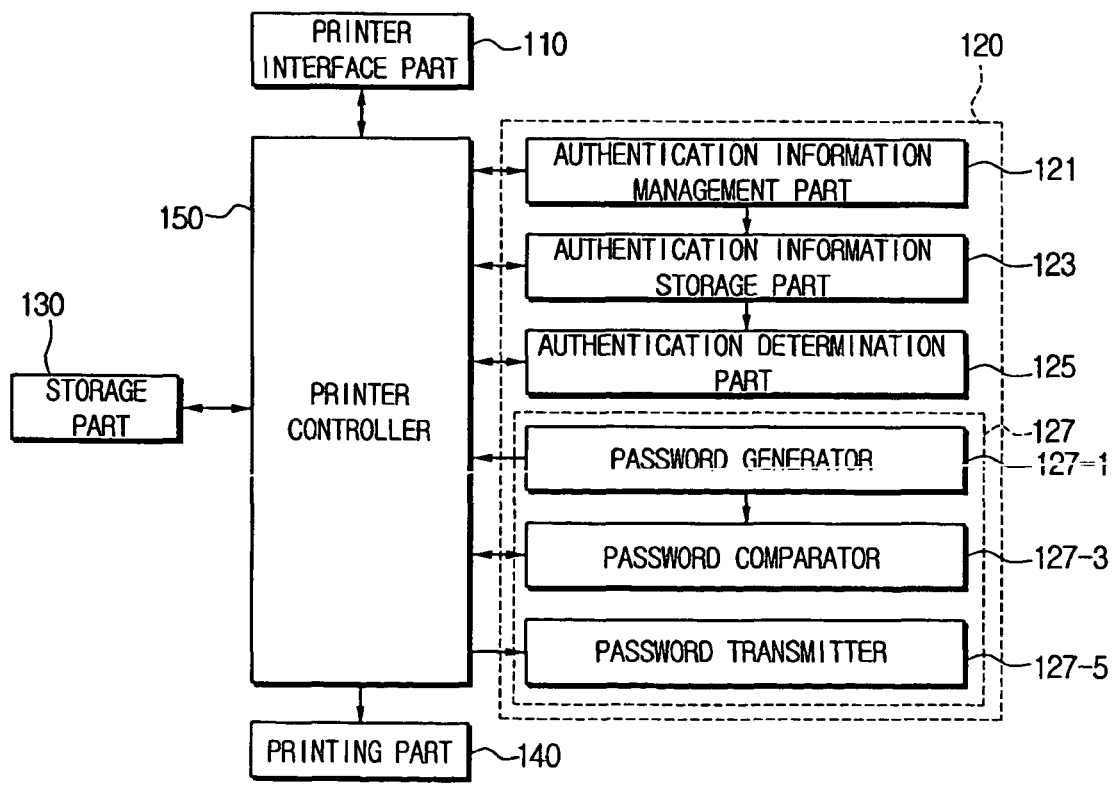
FIG. 2 is a block diagram showing a printer according to an embodiment of the present general inventive concept, which is capable of authorizing a printing limitedly according to a user level.

FIG. 2 is a block diagram showing a printer according to an embodiment of the present general inventive concept, which is capable of authorizing a printing limitedly according to a user level. Referring to FIG. 2, the printer comprises a printer interface part 110, an authentication part 120, a storage part 130, a printing part 140, and a printer controller 150.

The printer interface part 110 is provided accessible to an external device, such as a client PC (not shown) or a file server (not shown), and performs data communication with the external device.

When receiving a request to print data requiring security from the external device through the printer interface part 110 and the printer controller 150, the authentication part 120 determines whether to permit the printing of the data requested to be printed. More specifically, the authentication part 120 determines whether to permit the printing by comparing a security level of the data requested to be printed with a user level. The authentication part 120 comprises an authentication information management part 121, an authentication information storage part 123, an authentication determination part 125, and a password processing part 127.

The authentication information management part 121 is inputted with authentication information about a user who wants to register from the external device through the printer interface part 110 and the printer controller 150, and determines whether to permit the registration of the user based on the inputted authentication information. The authentication information storage part 123 stores therein the authentication information about the user who is allowed to register.

The authentication information storage part 123 will be described in detail below with reference to FIG. 3. FIG. 3 is a view explaining a database stored in the authentication information storage part 123.

Referring to FIG. 3, the authentication information stored in the authentication information storage unit 123 is about the user who is registered in the printer, and includes a user ID, a user level and a password receiving end.

The user level means a security level of data which is allowed to the user for printing. For example, it is assumed that the data ranges from the data having a highest security level 'A' to the data having a lowest security level 'D'. A user 1 who has a user level of 'B' is permitted to print the data having a security level 'B', 'C', or 'D', but is not permitted to print the data having a security level 'A'.

The password receiving end is where to receive a password generated by the password processing part 127, which will be described in detail below, and includes an e-mail address or a mobile phone number.

As shown in FIG. 3, there are three users as registered in the authentication information storage part 123 by way of example. The authentication information includes a user's ID such as 'user1', 'user2', and 'user3', user levels such as 'B', 'C', and 'A', and a user's password receiving end such as 'user1@samsung.com', '011-123-4567', and 'user3@samsung.com'.

Referring back to FIG. 2, the printer will be described in more detail.

When receiving a security level of data requested to be printed and an ID of a user who requests a printing from the external device through the printer interface part 110 and the printer controller 150, the authentication determination part 125 reads out a user level from the authentication storage part 123 with reference to the user's ID. After that, the authentication determination part 125 compares the received security level of the data with the read user level, and determines whether to permit the printing of the data.

The printing can be authorized limitedly as a result of the authentication procedure performed by the authentication determination part 125. However, the security cannot be guaranteed in a case that the user's ID is stolen. Therefore, the printer comprises the password processing part 127 to prevent the user's ID from being stolen. The password processing part 127 comprises a password generator 127-1, a password comparator 127-3, and a password transmitter 127-5.

The password generator 127-1 randomly generates a password under the control of the printer controller 150. The password generated by the password generator 127-1 is transmitted to an e-mail service server through the printer controller 150 and the printer interface part 110, or to a local telephone station through the printer controller 150 and the password transmitter 127-5. More specifically, if a designated user point (i.e., the password receiving end address, number, etc., of the user, as illustrated in FIG. 3) is at an e-mail address, the password is transmitted along the former path, and if the password receiving end has a mobile phone number, the password is transmitted along the latter path.

The password comparator 127-3 compares the random password generated by the password generator 127-1 with a password transmitted from the external device (at the designated user point) through the printer interface part 110 and the printer controller 150, and determines whether the passwords are identical to each other.

The storage part 130 stores therein a driving program to drive the printer, printing data transmitted from the external device, and information about a printing item which was printed by the printer.

The printing part 140 performs a printing job with respect to the data transmitted from the external device according to the control of the printer controller 150.

The printer controller 150 controls overall operations of the printer. More specifically, the printer controller 150 receives, from the external device through the printer interface part 110, the user's authentication information, the security level of the data requested to be printed, the user's ID, the data requested to be printed, and the password. The printer controller 150 applies the user's authentication information to the authentication management part 121, the security level of the data requested to be printed and the user's ID to the authentication determination part 125, the data requested to be printed to the storage part 130, and the password to the password comparator 127-3.

Also, the printer controller 150 transmits the password generated by the password generator 127-1 externally to the designated user point (with reference to the password receiving end address, number, etc., of the user stored in the authentication storage part 123). The printer controller 150 controls such that the data stored in the storage part 130 is applied to the printing part 140 to print, and the information about the printing item printed by the printing part 140 is stored in the storage part 130.

Figure 4:
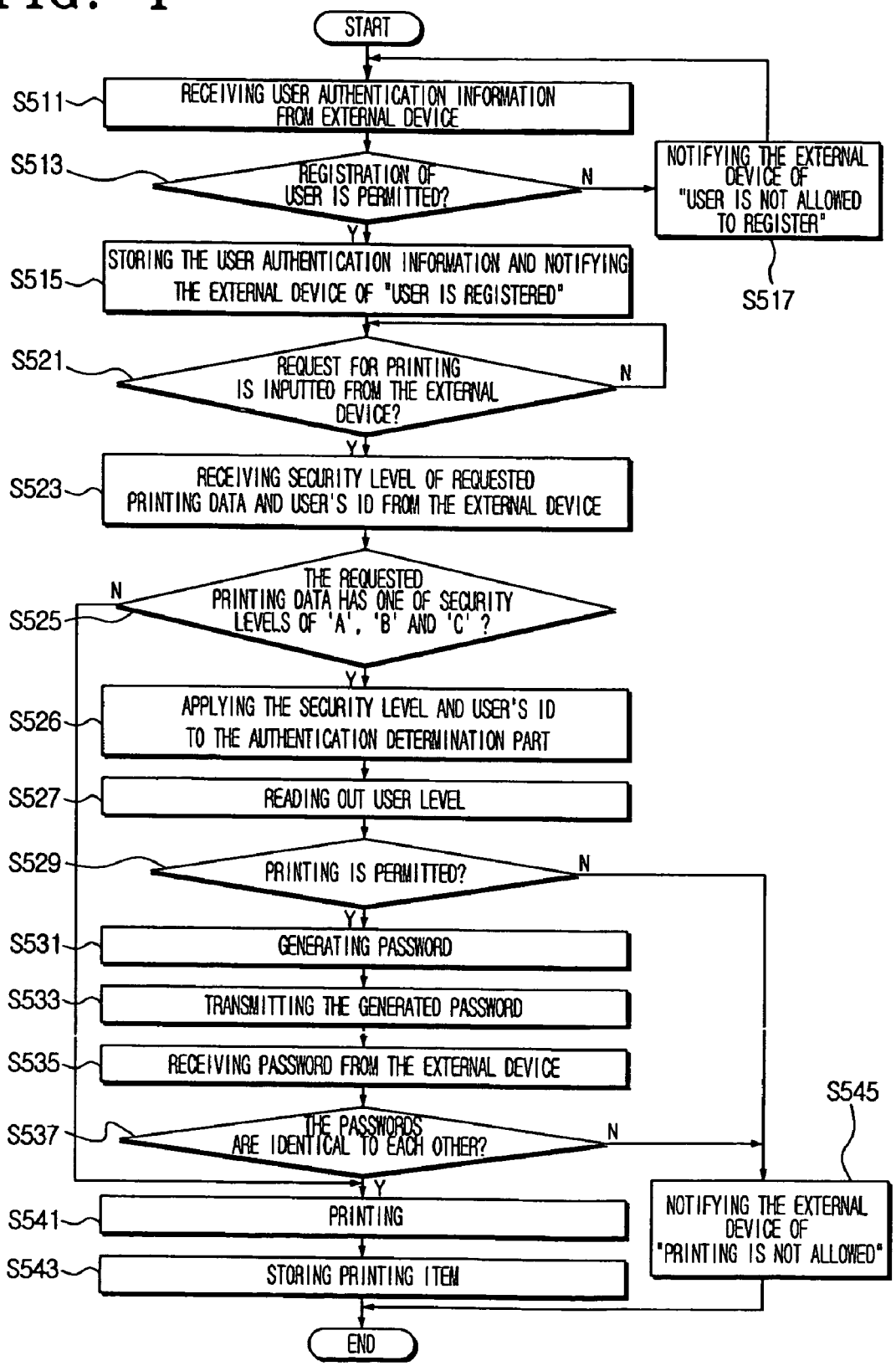
FIG. 4 is a flowchart showing exemplary operations of a printing method of the printer of FIG. 2, according to an embodiment of the present general inventive concept.

Hereinafter, a printing method of the printer of FIG. 2 will be described with reference to FIG. 4.

First, when a user wants to register for use of the printer, the user inputs his/her authentication information, such as an ID, a user level, and a user designation point (i.e., a password receiving end address, number, etc.), through the external device. The inputted user's authentication information is transmitted to the authentication information management part 121 through the printer interface part 110 and the printer controller 150 (operation S511).

The authentication information management part 121 determines whether to permit the registration of the user based on the inputted authentication information (operation S513).

If the user's registration is permitted in the operation S513, the authentication information management part 121 stores the user's authentication information in the authentication information storage part 123, and the printer controller 150 transmits a message, "the user is registered", to the external device through the printer interface part 110 (operation S515). If the authentication information management part 121 does not permit the user's registration in operation S513, the printer controller 150 transmits a message, "the user is not allowed to register," to the external device through the printer interface part 110 (operation S517), and returns to operation S511 to give the user an opportunity to confirm and re-input the authentication information.

Next, when the user requests a printing with respect to data requiring security through the external device (operation S521), the printer controller 150 receives the data requested to be printed, a security level of the data requested to be printed and a user ID through the printer interface part 110 (operation S523).

If the security level of the data requested to be printed is one of 'A', 'B' and 'C' levels (operation S525), the printer controller 150 applies the security level of the data requested to be printed and the user's ID to the authentication determination part 125 (operation S526).

The authentication determination part 125 reads out a user level from the authentication information storage part 123 with reference to the applied user ID (operation S527).

The authentication determination part 125 compares the security level of the data requested to be printed received in operation S523 with the user level read in operation S527, and determines whether to permit the printing based on the comparison (operation S529).

For example, if the user 1 requests a printing with respect to the data having a security level of 'C' through the external device, the external device transmits to the printer the user's ID, 'user 1', the security level 'C' of the data requested to be printed, and the data requested to be printed. The user's ID, 'user 1', and the security level of the data, 'C', are applied to the authentication determination part 125. The authentication determination part 125 reads out a user level 'B' of the user 1 (ID: user1) from the authentication information storage part 123 with reference the user's ID. After that, the authentication determination part 125 compares the security level 'C' of the data with the user level 'B'. At this time, because the user level 'B' is higher than the security level 'C', the printing of the data requested to be printed is permitted.

On the other hand, if the user 1 requests a printing with respect to data having a security level of 'A' through the external device, because the user level 'B' of the user 1 is lower than the security level 'A' of the data requested to be printed, the printing of the data is not permitted.

If the authentication determination part 125 permits the printing in operation S529, the result is transmitted to the printer controller 150, and the printer controller 150 controls the password generator 127-1 to randomly generate a password (operation S531).

The password generated by the password generator 127-1 is provided to the password comparator 127-3 and the printer controller 150. The printer controller 150 transmits the provided password externally to the designated user point (with reference to the password receiving end address, number, etc., of the user) stored in the authentication information storage part 123 (operation S533). More specifically, if the user's password receiving end is at an e-mail address, the printer controller 150 transmits the generated password to an e-mail service server through the printer interface part 110, and if the user's password receiving end has a mobile phone number, it transmits the generated password to a local telephone station through the password transmitter 127-5. Next, the user can confirm the password through the e-mail or a text message of the mobile phone.

Then, when the user inputs the password provided, as described above, to the external device, the external device transmits the password to the printer. The password is provided to the password comparator 127-3 through the printer interface part 110 and the printer controller 150 (operation S535).

The password comparator 127-3 compares the password provided in operation S535 with the password generated by the password generator 127-1, and determines whether the passwords are identical to each other (operation S537).

If the passwords are identical to each other (operation S537), the password comparator 127-3 transmits the result to the printer controller 150 such that the printer controller 150 provides the data to be printed stored the storage part 130 to the printing part 140 to perform the printing (operation S541).

When the printing is completed, the printer controller 150 stores, in the storage part 130, information about a printing item printed by the printing part 140 for the purpose of using in future cases.

Meanwhile, if the permission of printing is not obtained in operation S529, or if the passwords are not identical to each other in operation S537, the printer controller 150 transmits a message, "printing is not allowed," to the external device through the printer interface part 110 (operation S545).

If the security level of the requested printing data is 'D' in operation S525, the printing is performed without the authentication procedure and the password confirmation procedure. This is because the data of 'D' security level is general data that does not require the security.

Figure 5:
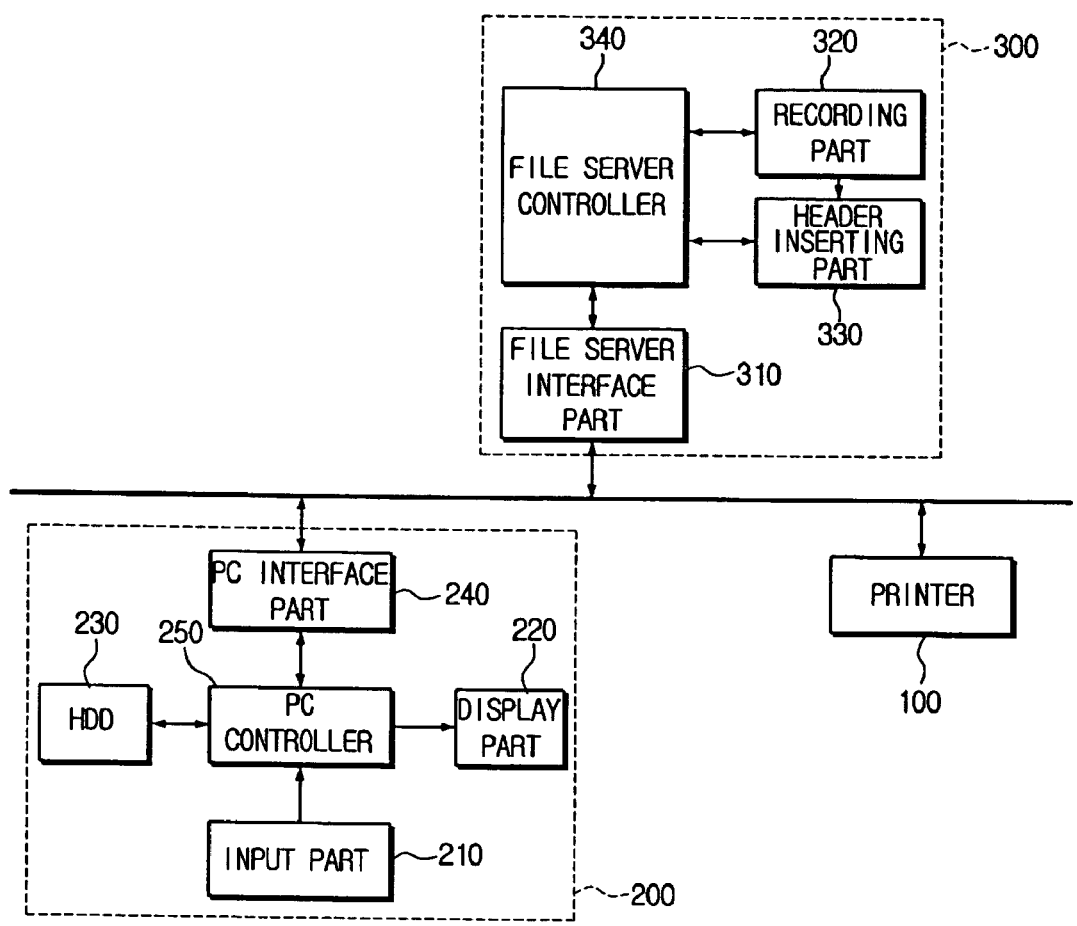
FIG. 5 is a view showing a printing system according to an embodiment of the present general inventive concept, which is capable of authorizing a printing limitedly according to a user level.

Hereinafter, a printing system having the printer of FIG. 2 will be described in detail with reference to FIG. 5. FIG. 5 is a block diagram showing a printing system according to an embodiment of the present general inventive concept, which is capable of authorizing a printing limitedly according to a user level. Referring to FIG. 5, the printing system comprises a printer 100, a client PC 200, and a file server 300, which are connected to one another.

Since the printer 100 is the same as that of FIG. 2, a detailed description is omitted.

The client PC 200 requests and receives data from the file server 300, and edits the received data or prepares new data and stores the data in the file server 300. The client PC 200 requests a registration of a user to the printer 100, and also requests the printer 100 to print certain data stored in the file server 300. The client PC 200 performing the above functions comprises an input part 210, a display part 220, an HDD 230, a PC interface part 240, and a PC controller 250.

The input part 210 is inputted with a user's command and can be embodied by a keyboard or a mouse. More specifically, the input part 210 is inputted with user's authentication information, a password, a request for printing, a request for data, and a security level of the data.

The display part 220 displays an operating state and an output of the client PC 200, and can be embodied by a monitor. More specifically, the display part 220 displays a content of the data received from the file server 300 and a message received from the printer 100.

The HDD 230 is a recording medium that stores an application driven in the client PC 200 and necessary data.

The PC interface part 240 is provided accessible to the printer 100 and the file server 300 to communicate with them.

The PC controller 250 controls overall operation of the client PC 200, and executes the application stored in the HDD 230. More specially, the PC controller 250 transmits the user's command inputted through the input part 210 to the printer 100 or the file server 300 through the PC interface part 240, and displays on the display part 220 information and a message received from the printer 100 or the file server 300 through the PC interface part 240. Also, the PC controller 250 transmits the user's ID inputted through the input part 210 to the file server 300 through the PC interface part 240.

Figure 6A:
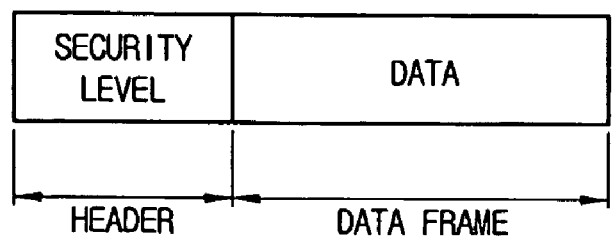
FIG. 6A is a view showing a structure of a data frame transmitted from the client PC to the file server of FIG. 5.

The PC controller 250 transmits the edited/prepared data and a security level of the data to the file server 300 through the PC interface part 240. More specifically, the PC controller 250 transmits to the file server 300 through the PC interface part 240 a data frame which is generated by inserting a header including a security level to the edited/prepared data as shown in FIG. 6A.

The file server 300 stores therein the data edited/prepared by the client PC 200 together with the security level of the data, and inserts a predetermined header to requested printing data and transmits it to the printer 100. The file server 300 comprises a file server interface part 310, a recording part 320, a header inserting part 330, and a file server controller 340.

The file server interface part 310 is provided accessible to the printer 100 and the client PC 200 to communicate with them.

The recording part 320 can be a recording medium that records thereon the data edited/prepared by the client PC 200 together with security levels of the data.

Figure 6B:
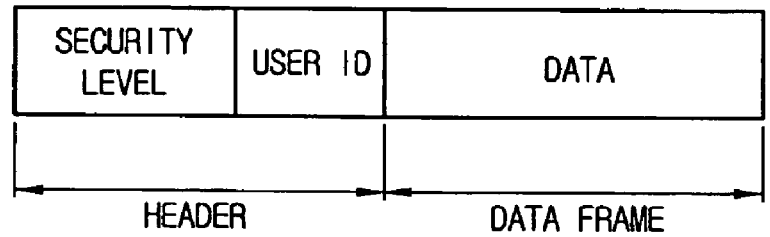
FIG. 6B is a view showing a structure of a data frame transmitted from the file server to the printer server of FIG. 5.

The header inserting part 330 reads out data requested to be printed and a security level of the data from the recording part 320 and is applied with a user's ID from the file server controller 340. The header inserting part 330 inserts to the read data a header including the security level of the data and the user's ID, thereby generating a data frame as shown in FIG. 6B.

The file server controller 340 controls overall operation of the file server 300. That is, the file server controller 340 records the data received from the client PC 200 through the file server interface part 310 and the security levels of the data on the recording part 320, and applies the user's ID received from the client PC 200 to the header inserting part 330.

The file server controller 340 transmits the data frame generated by the header inserting part 330 to the printer 100 through the file server interface part 310.

Figure 7:
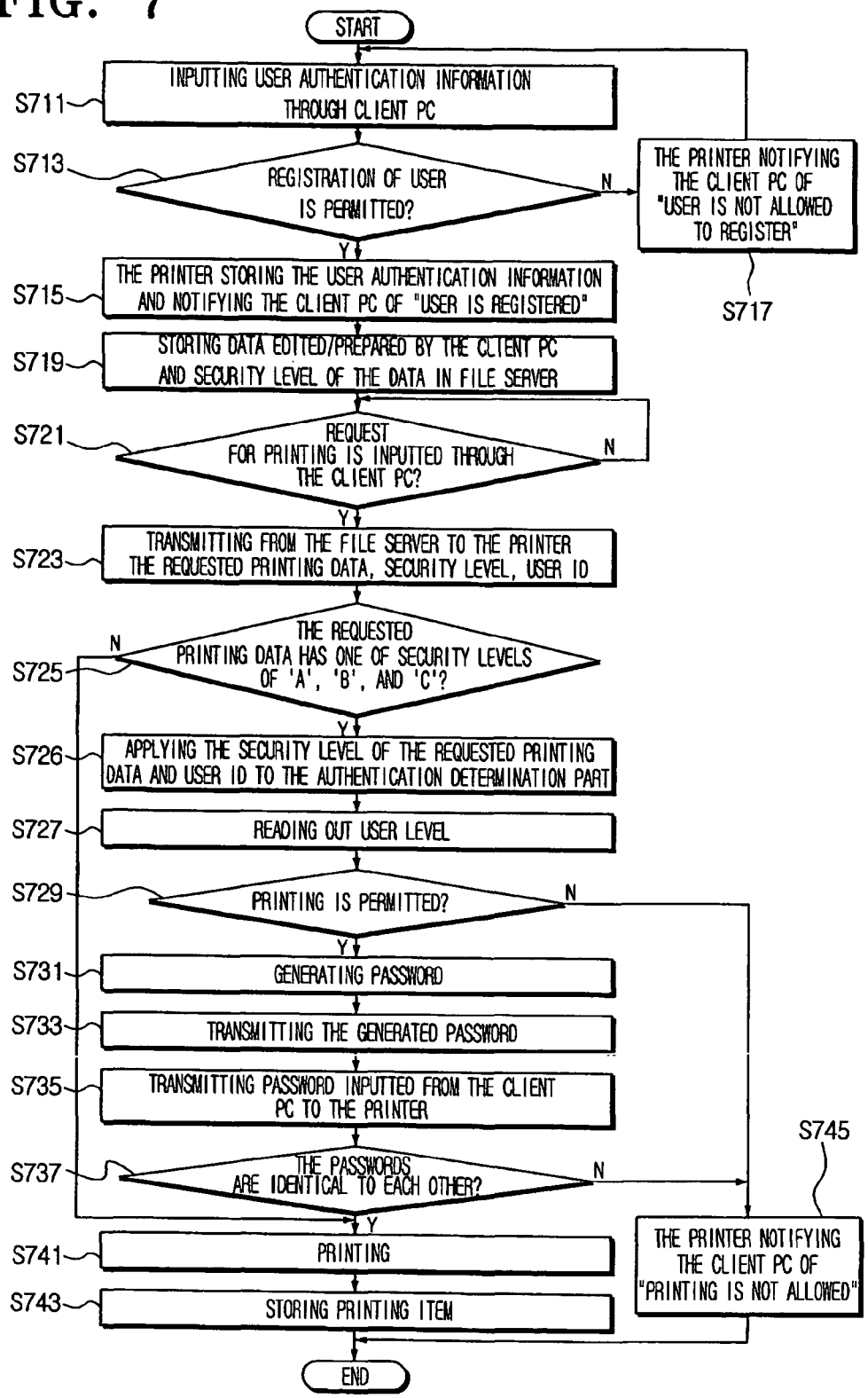
FIG. 7 is a flowchart showing exemplary operations of a printing method of the printing system of FIG. 5, according to an embodiment of the present general inventive concept.

Hereinafter, a printing method of the printing system of FIG. 5 will be described with reference to FIG. 7.

When a user wants to register for use of the printer 100, the user inputs his/her authentication information including a user's ID, a user level and a password receiving end address, number, etc., to the input part 210 of the client PC 200. The inputted user's authentication information is then transmitted to the printer 100 (operation S711).

The authentication management part 121 of the printer 100 determines whether to register the user based on the transmitted authentication information (operation S713).

If the user obtains permission to register in operation S713, the authentication information management part 121 stores the user's authentication information in the authentication information storage part 123, and the printer 100 transmits a message, "the user is registered", to the client PC 200 (operation S715). The transmitted message is displayed on the display part 220 of the client PC 200. If the authentication information management part 121 does not permit the user's registration in operation S713, the printer 100 transmits a message, "the user is not allowed to register," to the client PC 200 (operation S717), and returns to the operation S711 to give the user an opportunity to confirm and re-input the authentication information.

The client PC 200 requests and receives data from the file server 300 at the request of a user, and also edits the received data or prepares new data. The data prepared by the client PC 200 is stored in the file server 300. At this time, the file server 300 stores therein the edited/prepared data together with security levels of the data (operation S719).

Next, when the user requests a printing with respect to certain data stored in the file server 300 through the input part 210 of the client PC 200 (operation S721), the client PC 200 transmits the request to print and the user's ID to the file server 300. The header inserting part 330 of the file server 300 reads out the data requested to be printed from the recording part 320 and generates a data frame by inserting a header including a security level of the data and the user's ID to the read data requested to be printed. The file server 300 transmits the generated data frame to the printer 100 (operation S723).

If the security level of the data included in the header of the data frame is one of 'A', 'B', and 'C' levels (operation S725), the printer controller 150 of the printer 100 applies the security level of the data requested to be printed and the user's ID to the authentication determination part 125 (operation S726).

The authentication determination part 125 reads out a user level from the authentication information storage part 123 with reference to the applied user's ID (operation S727).

The authentication determination part 125 compares the security level of the data received in operation S723 with the user level read out in operation S727, and determines whether to permit the printing (operation S729).

If the printing is permitted by the authentication determination part 125 in operation S729, the result is transmitted to the printer controller 150. Then, the printer controller 150 controls the password generator 127-1 to randomly generate a password (operation S731).

The password generated by the password generator 127-1 is provided to the password comparator 127-3 and the printer controller 150, and the printer controller 150 transmits the provided password to the user designated point through an e-mail server or a local telephone station, with reference to the password receiving end address, number, etc., of a designated user point, stored in the authentication storage part 123 (operation S733). Then, the user confirms the password through the e-mail or a text message of the mobile phone.

If the user inputs the password to confirmed the same, as described above, through the input part 210 of the client PC 200, the client PC 200 transmits the inputted password to the printer 100 (operation S735).

The password comparator 127-3 of the printer 100 compares the password transmitted in operation S735 with the password transmitted from the password generator 127-1, and determines whether the passwords are equal to each other (operation S737).

If the passwords are determined to be equal to each other in operation S737, the password comparator 127-3 transmits the result to the printer controller 150. Then, the printer controller 150 applies the data requested to be printed stored in the storage part 130 to the printing part 140 to perform the printing (operation S741).

When the printing is completed, the printer controller 150 stores information about a printing item printed by the printing part 140 in the storage part 130 (operation S743) for the purpose of use in future cases.

Meanwhile, if the permission is not obtained in operation S729, or if the passwords are not equal to each other in operation S737, the printer 100 transmits a message, "printing is not allowed", to the client PC 200 (operation S745).

Also, if the security level of the data requested to be printed is 'D' in operation S725, the printing is performed without the authentication procedure and the password confirmation procedure.

Although the printing system according to an embodiment of the present general inventive concept has one single printer 100, client PC 200, and file server 300 connected to one another, this should not be considered as limiting. The present general inventive concept can be applied to a printing system comprising a plurality of printers, client PCs, and file servers.

As described above, according to the present general inventive concept, the printing is limitedly permitted to the user according to the user level, and only the data having a security level lower than the user level is printed. Accordingly, even if a user obtains an access to the system, because the user has a limitation in using and printing the data depending on his/her position or job, the security of the data can be more effectively guaranteed. Also, due to the password confirmation procedure to prevent the user ID from being stolen, the security function is more reinforced. Also, since the printing item is recorded after the printing, the data can be secured from a post potential event.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electro-magnetic field, RF network, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing device to print data which requires security, comprising:
    an interface part receiving a request to print data by a user and a security level of the data requested to be printed;
    an authentication part to determine whether to permit a printing of the data requested to be printed based on whether a pre-stored user level of the user is higher than the security level of the requested data, the authentication part comprising a password processing part to randomly generate a password and transmit the password to the user, the password processing part to determine whether the generated password and a password inputted by the user and obtained by the interface part are equal to each other;
    a printing part to print the data requested to be printed; and
    a controller to transmit the data requested to be printed received through the interface part to the printing part if the authentication part permits the printing.

2. The printing device as claimed in claim 1, wherein the authentication part comprises:
    an authentication information storage part to store an authentication information including the user level; and
    an authentication determination part to permit the printing if the user level stored in the authentication information storage part is higher than the security level.

3. The printing device as claimed in claim 2, wherein if the authentication determination part permits the printing and the password processing part determines that the passwords are equal to each other, the controller transmits the data requested to be printed received through the interface part to the printing part.

4. The printing device as claimed in claim 3, wherein the password processing part comprises:
    a password generator to randomly generate a password;
    a password transmitter to transmit the generated password externally so that the user receives the password; and
    a password comparator to determine whether the password generated by the password generator and the password inputted by the user are identical to each other.

5. The printing device as claimed in claim 2, wherein the authentication part further comprises an authentication information management part to determine whether to register the user based on the inputted authentication information of the user, and if the user is determined to be registered, to store the authentication information of the user in the authentication information storage part.

6. A printing method of a printing device to print data which requires security, the printing method comprising:
    receiving a print data request by a user and a security level of the data requested to be printed by the printing device;
    determining whether to permit a printing with respect to the data requested to be printed based on whether a pre-stored user level of the user is higher than the security level of the requested data and by randomly generating a password, transmitting the generated password externally so that the user receives the password, and determining whether the generated password and a password inputted by the user and received by the printing device are identical to each other; and
    printing the data requested to be printed if the printing is permitted.

7. The printing method as claimed in claim 6, wherein the operation of determining whether to permit a printing with respect to the data requested to be printed based on the security level and a pre-stored user level of the user permits the printing if the user level is higher than the security level.

8. The printing method as claimed in claim 6, wherein the operation of determining whether to permit a printing with respect to the data requested to be printed based on the security level and a pre-stored user level of the user comprises the operation of:
    permitting the printing with respect to the data requested to be printed if the user level is higher than the security level and if the passwords are identical to each other.

9. The printing method as claimed in claim 6, further comprising the operations of determining whether to register the user based on authentication information of the user inputted by the user, and if the user is determined to be registered, storing the authentication information.

10. A printing system comprising:
    a file server to store therein data which requires security and a security level of the data;
    a client to request the data stored in the file server to be printed; and
    a printing device to receive the data requested to be printed from the file server and the security level of the data, and based on the security level and a pre-stored user level of the user, to determine whether to permit a printing of the data requested to be printed,
    wherein the printing device includes an authentication part which determines whether to permit a printing with respect to the data requested to be printed based on whether the pre-stored user level is higher than the security level of the requested data, and by randomly generating a password, transmitting the generated password externally so that the user receives the password and determining whether the generated password and a received password inputted by the user through the client are identical to each other.

11. The printing system as claimed in claim 10, wherein the printing device comprises:
   a printing device interface part to receive the data requested to be printed and the security level of the data from the file server;
   an authentication part to determine whether to permit a printing with respect to the data requested to be printed based on the security level and the pre-stored user level;
   a printing part to print the data requested to be printed; and
   a printing device controller, if the printing is permitted, to transmit the data requested to be printed received through the printing device interface part to the printing part.

12. The printing system as claimed in claim 11, wherein the authentication part comprises:
   an authentication information storage part to store therein authentication information including the user level corresponding the user who requests the printing; and
   an authentication determination part to permit the printing if the user level stored in the authentication storage part is higher than the security level.

13. The printing system as claimed in claim 10, wherein the file server comprises:
   a storage part to store the data and the security level of the data;
   a header inserting part to read out the data and the security level of the data from the storage part and to generate a data frame by inserting a header including the security level of the data to the data;
   a file server interface part to receive the data frame and to transmit the data frame to the printing device; and
   a file server controller to control the header inserting part to generate the data frame with respect to the data requested to be printed which is requested by the user through the client, and to apply the data frame generated by the header inserting part to the file server interface part.

14. A printing method of a printing system which comprises a file server storing data and security levels of the data, a client requesting data stored in the file server to be printed, and a printing device printing the data requested to be printed, the printing method comprising the operations of:
   the client transmitting a request for printing to the file server;
   the file server transmitting the data requested to be printed and the security level of the data to the printing device;
   the printing device determining whether to permit a printing with respect to the data requested to be printed based on whether a pre-stored user level of the user is higher than the security level of the requested data and by randomly generating a password, transmitting the generated password externally so that the user receives the password, and determining whether the generated password and a received password inputted by the user through the client are identical to each other; and
   if the printing is permitted, the printing device printing the data requested to be printed.

15. The printing method as claimed in claim 14, wherein, in the operation of the file server transmitting the data requested to be printed and the security level of the data to the printing device, the file server generates a data frame by inserting a header including the security level of the data requested to be printed to the data, and transmits the data frame to the printing device.

16. The printing method as claimed in claim 14, wherein the operation of the printing device determining whether to permit a printing with respect to the data requested to be printed based on the security level and a pre-stored user level of the user, permits the printing if the user level is higher than the security level.

17. The printing method as claimed in claim 14, wherein the operation of the printing device determining whether to permit a printing with respect to the data to be printed based on the security level and a pre-stored user level of the user comprises the operation of:
   permitting the printing with respect to the data requested to be printed if the user level is higher than the security level and if the passwords are identical to each other.

18. A printing device comprising:
   an interface part to receive a request to print data by an external source and a security level of the data requested to be printed;
   an authentication part to determine whether to permit a printing of the data requested to be printed based on whether a pre-stored level of the external source is higher that the security level of the requested data, the authentication part further comprises a password processing part which randomly generates a password and transmits the password to the external source, the password processing part determines whether the generated password and a password inputted by the external source and obtained by the interface part are equal to each other; and
   a printing part to print the data requested to be printed.

* * * * *